(12) United States Patent
Colizzi et al.

(10) Patent No.: US 6,504,822 B1
(45) Date of Patent: Jan. 7, 2003

(54) DEVICE AND METHOD FOR DETECTING AND/OR MEASURING THE MISCONNECTION TIME IN TELECOMMUNICATION NETWORKS

(75) Inventors: Ernesto Colizzi, Milan (IT); Lucia Bianchi, Milan (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/217,828

(22) Filed: Dec. 22, 1998

(30) Foreign Application Priority Data

Dec. 31, 1997 (IT) .......................................... TO97A1152

(51) Int. Cl.[7] ................................................. H04J 1/16
(52) U.S. Cl. ........................................ 370/241; 370/503
(58) Field of Search ................................. 375/227, 355, 375/356; 370/474, 389, 241, 252, 254, 242, 245, 246, 247, 248, 249, 250, 251, 253, 350, 503, 505, 506, 507, 509, 510, 511, 512, 514, 520, 342, 441

(56) References Cited

U.S. PATENT DOCUMENTS 3,965,294 A * 6/1976 Renz et al. ................. 375/227

5,521,915 A * 5/1996 Dieudonne et al. ......... 370/474

OTHER PUBLICATIONS

International Telecommunication Union, ITU–T G.841 (Draft) General Aspects of Digital Transmission Systems, Types and Characteristics of SDH Network Protection Architectures, Apr. 1995 Version pp. 1–99.

* cited by examiner

*Primary Examiner*—Dang Ton
(74) *Attorney, Agent, or Firm*—Sughrue Moin, PLLC

(57) ABSTRACT

A device for detecting misconnections and/or measuring the misconnection time in telecommunication networks, specifically in MS-SPRING fiber optic telecommunication networks. The device includes pattern generator/checker transmitter blocks for generating sequence of test words designed to be connected with inlets of the telecommunication network and capable of inserting at the inlets, test words which are characteristics of the inlet where they are introduced, as well as detecting blocks designed to be connected with outlets of the telecommunication network and capable of recognizing the incoming test words and the inlet, which they come from.

17 Claims, 2 Drawing Sheets

DEVICE AND METHOD FOR DETECTING AND/OR MEASURING THE MISCONNECTION TIME IN TELECOMMUNICATION NETWORKS

BACKGROUND OF THE INVENTION

This invention concerns a device for detecting and/or measuring the misconnection time in telecommunication networks, particularly MS-SPRING (Multiplexed-Shared Protection Ring) fiber optic telecommunication networks.

Hereafter the term "telecommunication networks" will indicate signal conveying networks, either according to PDH (Plesiochronous Digital Hierarchy) standard or the more recent SDH (Synchronous Digital Hierarchy) standard. Anyway, the device for detecting misconnections according to this invention can be used in all telecommunication networks set up according to any standard, where misconnections can be generated even if simply due to an error of the managing software.

Telecommunication networks comprise units, located in the switched telephonic exchanges, designed as "switching matrixes", which establish circuits interconnection in order to put users in communication. Switching matrixes operate according to users' requests or under direct control of the network manager, setting up the so-called semi-permanent connections. In addition to the above main purpose, i.e. traffic management according to connection requests, switching matrixes may also be used for a second purpose consisting in their use as units for automatic traffic re-routing should a connection interruption among the network nodes occur. Switching matrixes designed to perform said second function are typically contained in ADM (Add Drop Multiplexer) or "cross connects" network nodes and they operate on semi-permanent connections.

A switching matrix has to ensure that in no way both a non requested connection or a connection which is different from the requested one, i.e. a misconnection, should be actuated. In this circumstance, in fact, damages may ensue for the user due to a loss of privacy or wrong operation of the processors automatically exchanging information through the switching matrix.

This danger is very high for a special communication network class called "MS-SPRING" where, in the event of a connection interruption in the network nodes, the automatic traffic routing device may result in transient or permanent misconnections should the necessary precautions not have been taken, i.e. a correct and careful software and hardware design capable of implementing an automatic traffic routing. For this reason the automatic routing device of MS-SPRING networks is checked through a proper procedure, called validation procedure, after both design and its implementation.

The Standards dealing with MS-SPRING networks, e.g. ITU-T Standard G841 'CCITT Recommendation G 841, Draft, April 1995", underline that misconnections for said networks must be avoided.

However, so far no devices or procedures are known for detecting such misconnections and measure their duration to simplify and obtain an effective MS-SPRING network validation procedure.

As a matter of fact devices are known, generally defined as "Test Pattern Generators/Checkers". Indeed, this definition refers to at least two devices, namely a transmitter connected to one inlet of the network and a receiver connected to one outlet of the network, which receiver is able to co-operate with the transmitter, i.e. the receiver decodes the special signal pattern introduced in the network by the transmitter and is aware of the special signals pattern to be received, so as to detect possible deviations and errors. "Test Pattern Generators/Checkers" are used for instance to check connection operation during validation tests of a telecommunication network.

Some of the means pertaining to the above category of "Test Pattern Generators/Checkers" are known as PRBSs (Pseudo Random Bit Sequences), such means generating sequences which are recognized by a proper receiver and used for auto-synchronizing purposes. However, a drawback is represented by the length of said patterns. PRBSs presently available on the market offer only three pattern lengths: $2^9-1$ bits, i.e. a signal with a 511-bit cycle, $2^{15}-1$ bits, i.e. a signal with a 32767-bit cycle, $2^{23}-1$ bits, i.e. a signal with an about 8-Mbit cycle. As a matter of fact, the misconnection time may be significantly shorter than the time required to transmit the pattern and recognize it at the receiver. Since said devices require more than one pattern length to engage and become aligned, it may happen that no misconnection is detected. Moreover, it should be noted that the Standards do not define a minimum misconnection time to be detected for MS-SPRING networks.

Short-length (16 bits) repeated-word generators are also known. However, said repeated word generators do not allow any autosynchronization with the receiver.

Moreover, both PRBSs and repeated word generators do not allow the achievement of the following information, which is crucial in the presence of misconnections, i. e. which pattern has been received instead of the expected pattern and which inlet it comes from.

In order to perform said operation with the PRBSs, it would be necessary for instance, to connect a receiver with each network outlet and check afterwards which receiver, instead of the expected one, has signaled the reception of the expected pattern.

Further, through known devices it is not possible to obtain information about the misconnection time, as these devices can only measure the loss-of-traffic time but not the time during which traffic is effectively provided. This prevents the duration of the real misconnection to be known from the reception of the all-ones signal representing the "squelching", or even from the noise reception.

Finally, the word length of known means cannot be changed, so that these means are not suitable to detect and measure the duration of misconnections under different conditions.

SUMMARY OF THE INVENTION

The present invention seeks to solve the above mentioned drawbacks and to provide a device for detecting and/or measuring misconnection time in telecommunication networks, specifically MS-SPRING networks.

Within this scope, it is the main object of this invention to provide a device for detecting and/or measuring misconnection time in telecommunication networks, which allows the detection of short-time misconnections and the origin of the signals, received as a consequence of said misconnections.

It is a further object of this invention to provide a device for detecting and/or measuring misconnection time in telecommunication networks provided with detecting and measuring means, which can be easily associated with the telecommunication network.

It is a further object of this invention to provide a device for detecting and/or measuring misconnection time in telecommunication networks, which allows the minimum detectable misconnection time to be changed.

It is a further object of this invention to provide a device for detecting and/or measuring misconnection time in telecommunication networks, capable of distinguishing misconnections from other events due to network malfunctions.

In order to achieve such objects, the present invention provides a device for detecting and/or measuring misconnection time in telecommunication networks and/or a method for detecting and/or measuring misconnection time and/or a test signal generator-transmitter and/or a test signal detector incorporating the characteristics of the annexed claims, which form an integral part of this description.

BRIEF DESCRIPTION OF THE DRAWING

Further objects, features and advantages of this invention will become apparent from the following detailed description and annexed drawings, which are only supplied by way of a non limiting example, wherein.

DETAILED DESCRIPTION OF THE INVENTION

Figure 1:
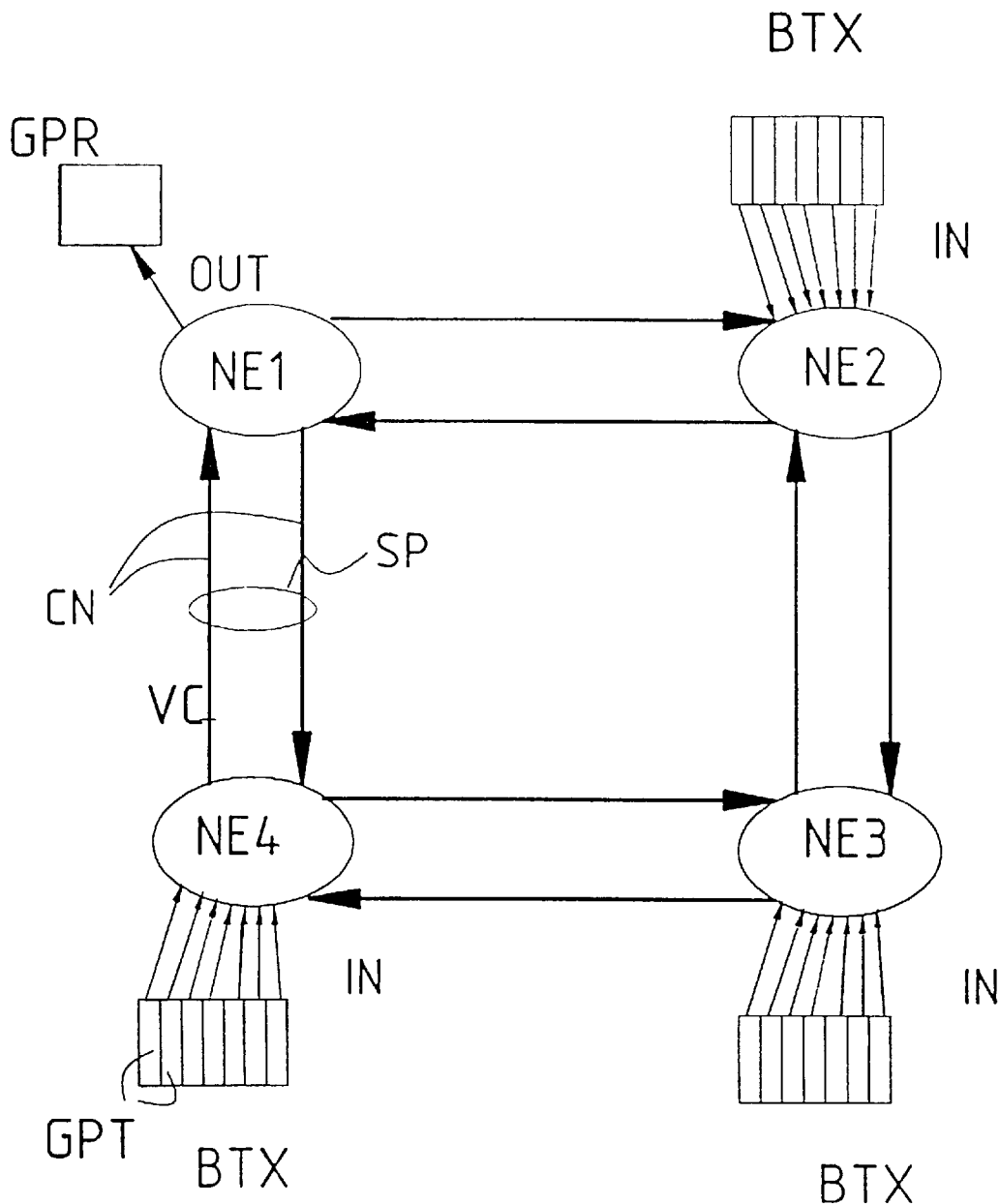
FIG. 1 shows a general schematics of a telecommunication network provided with a device for detecting and/or measuring misconnection time in telecommunication networks according to the invention.

FIG. 1 shows by way of example a system for detecting and/or measuring misconnection times in telecommunication networks according to the invention.

Therein a telecommunication network 1 operating according to SDH Standard, provided with four network elements NE1, NE2, NE3, NE4, is shown. Said network elements NE1, NE2, NE3, NE4, also called nodes, are connected by spans SP, of e.g. optical fibers. Each of said spans SP comprises two connections CN, one for clockwise traffic and the other for counterclockwise traffic. It is clear that connections CN provide for exchanging data sequences VC among the users through network elements NE.

Data sequences VC are structured according to SDH protocol, which is known per se; for instance data sequences VC are STM-1 frames.

For clarity, the telecommunication network 1 is shown as provided with only one ring, but it is generally composed of many network rings variably connected each other.

All network elements NE are provided with inlets IN and outlets OUT. For semplicity of description, FIG. 1 shows only one outlet OUT and three groups of inlets IN. During standard operation of the telecommunication network 1, bit streams are introduced at a constant bit rate and according to standardized bit rate values through said inlets IN and will be retrieved from outlets OUT. Said bit streams have no particular pattern format in general. In the specific case of SDH Standard the only constraints, as said above, are related to the bit rate. Bit streams are introduced in the telecommunication network 1 in the data sequence VC according to SDH protocol. The same considerations apply to data flows coming out from the network ring 1.

According to this invention, some blocks BTX, each of them consisting in a plurality of pattern generator/checker transmitters GPT, are connected with the inlets IN of network elements NE1, NE2, NE3, respectively, whereas a pattern generator/checker receiver GPR is connected with the outlet OUT of the network element NE4. For simplicity only one pattern generator/checker receiver GPR is shown in order to make clear how the method according to this invention works. However, a complete and effective operation of the device for detecting and/or measuring misconnection time according to this invention will require that all inlets IN of all telecommunication network nodes be connected with pattern generator/checker transmitters GPT and all telecommunication network outlets be connected with pattern generator/checker receivers GPR.

The pattern generator/checker transmitter blocks BTX can generate sequences of test words W, which test words consist of a N-bit sequence, and insert said test words through inlets IN of network elements NE in the telecommunication network. Such test works W are read and decoded by pattern generator/checker receivers GPR.

Figure 2:
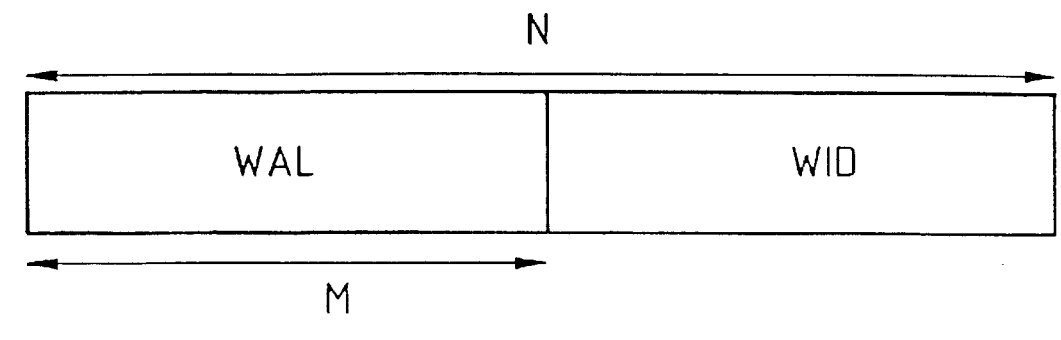
FIG. 2 shows a general schematics of the test signal sequences transmitted by the device for detecting and/or measuring the duration of misconnections in telecommunication networks according to the invention.

For a better understanding, refer to the diagram of FIG. 2. The test word or test signal W consists of an alignment or synchronization word WAL and a proper real identification word WID. The identification word WID is a M-bit sequence, while the alignment word WAL has consequently a M−N bit length.

The test word W is then inserted at a given position in data sequences VC, i.e. in the so called payload, or the data section of a data sequence according to SDH protocol.

The alignment word WAL is a pre-defined sequence allowing the pattern generator/checker receiver GPR to recognize the presence of the test word W, or to know whether it is receiving a test word and synchronize with it. In the embodiment described herein, the number N of bits of the test word WAL is equal to 32, whereas the number M of bits of the alignment word WAL is equal to 17, i.e. a sequence of 16 ZEROS followed by a ONE. Therefore the identification word WID is N−M long, i.e. 32−17=15 bits. The length of words WAL and WID has been determined by imposing the condition M>N/2. Said condition, in fact, along with the choice of the alignment word WAL previously described, will hinder the alignment word WAL from being a binary sequence similar to that forming the identification word WID.

In general it should also be noted that the choice of the alignment word sequence WAL shall be such that said alignment word WAL cannot be divided in a first subword and a second subword, where the first subword is at least as long as the second subword and where the second subword coincides with the initial portion of the first subword. Moreover, the identification word WID indicates, in the simplest situation, an identification code of the pattern generator/checker transmitter GPT as the source of the specific test word W, or of the inlet IN connected with the pattern generator/checker transmitter GPT.

Therefore, when blocks BTX of pattern generator/checker transmitters GPT are connected to the inlets of the network elements NE1, NE2, NE3 and the pattern generator/checker receiver GPR is connected to one outlet of the network element NE4, pattern generator/checker transmitters GPT will insert in the telecommunication network 1 through inlets IN repeated sequences of auto-synchronizing test words W, said test words W being also distinctive of the inlets IN which they are generated at.

Said test words W within the telecommunication network 1 of FIG. 1, which uses SDH protocol, are then introduced, as mentioned above, in data sequences VC at a determined position set forth by the SDH protocol. This means that if the telecommunication network 1 is different, for instance PDH protocol is in use, then test words W within the communication network would be conveyed in a different way, although insertion of test words W at inlets IN and retrieval thereof at outlets OUT are not different.

Therefore, the pattern generator/checker receiver GPR recognizes the test word W being received as set forth through the alignment word WAL and thus is able to recognize the subsequent identification word WID bearing the information or identifier related to the pattern generator/checker transmitter GPT that has generated it, or the inlet IN which it is connected with. Once the identifier has been retrieved, the pattern generator/checker receiver GPR compares it with the expected identifier, which has been provided by a device controller, as it generally occurs for pattern generators/checkers. In the instance of a lack of coincidence, the pattern generator/checker receiver GPR recognizes the received identifier. Obviously, if the received identifier differs from the expected identifier an event of misconnection occurs and its duration is detected taking into account the time interval during which there is a discrepancy between the expected identifier and the received one.

The number N of bits may be small, as in the embodiment to ensure a more promptness in detecting any misconnections. The choice of a greater N obviously results in a larger number of different identifiers and is therefore a suitable choice for a network with a large number of inlets and outlets, but such an arrangement reduces the promptness in detecting a misconnection.

It should also be mentioned that pattern generator/checker transmitters GPT and pattern generator/checker receivers GPR are controlled by a microprocessor not shown here, whose main function is essentially to set the identifier to be transmitted through the identification word WID for each pattern generator/checker transmitter GPT.

Figure 3:
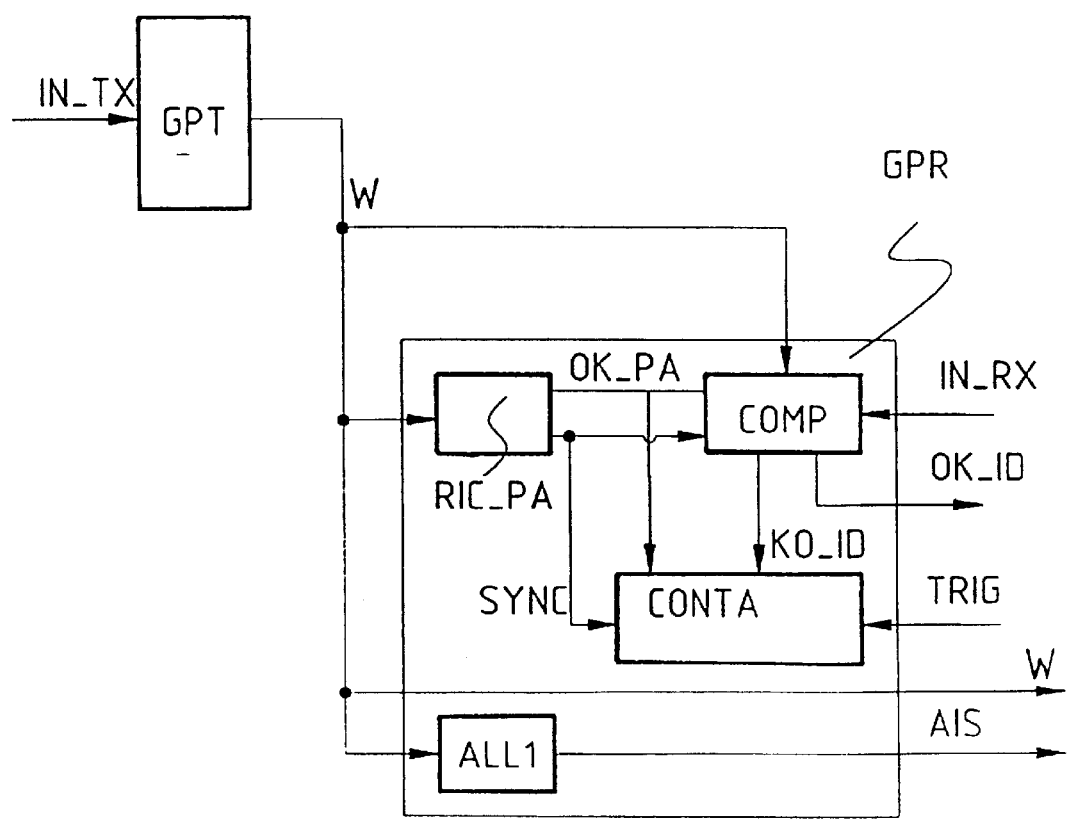
FIG. 3 shows a general schematics of the circuit details of the device for detecting and/or measuring misconnection time in telecommunication networks of FIG. 1.

FIG. 3 shows a general schematics of the pattern generator/checker receiver GPR of FIG. 1, connected with a pattern generator/checker transmitter GPT.

The pattern generator/checker transmitter GPT receives at its input a sequence IN_TX which identifies the source, i.e. the proper inlet IN which the test word W is transmitted to and outputs the test word W, consisting of the alignment word WAL and identification word WID, said identification word WID being formulated according to the sequence IN_TX. The sequence IN_TX can be provided by software or set through manual selection means, such as keyboards or switches, although this solution is less effective in case a large number of pattern generator/checker transmitters GPT are provided in the arrangement and are to be set.

The pattern generator/checker receiver GPR receives at its input the test word W and sends it to a circuit identifying the alignment word RIC_PA and to a squelching identifying circuit ALL1, as well as to a comparing circuit COMP. The circuit identifying the alignment word RIC_PA, consisting essentially of two finite state machines connected in series, one for identifying the alignment word WAL, and the other for determining a possible out-of-alignment state, outputs a recognition signal OK_PA. Said recognition signal OK_PA is brought to the comparing circuit input COMP to enable its operation. The circuit identifying the alignment word RIC_PA also outputs a synch signal SYNC, which is able to synchronize the comparing circuit COMP with the test word W. Said comparing circuit COMP will compare the identifier contained in the identification word WID of the test word W with an expected identifier IN_RX. If the expected identifier IN_RX matches with the identifier contained in the identification word WID, the comparing circuit COMP will issue a correct identification signal OK_ID. Otherwise a failed identification signal KO_ID will be issued.

The squelching identification circuit ALL1 is able to detect the presence of a sequence of ONEs instead of the test word W, conventionally being an indication that the protection device is at least temporarily unable to recover the requested connection because of a failure. In this case the identification circuit ALL1 will output a squelching signal AIS.

A counter circuit CONTA is also provided, which receives the recognition signal OK_PA, the failed identification signal KO_ID and the synch signal SYNC, the latter as a clock signal. Said signals are used by the counter CONTA to measure the misconnection time. Finally, a reset signal TRIG can be sent to the counter CONTA to reset it when detecting and measuring operations start.

Moreover, the test word W is output from the pattern generator/checker receiver GPR in order to know, at all events, which test word W is being received and thus have information about the inlet IN where said test word W is coming from, also when the test word W is wrong due to a misconnection.

As one can infer from the above description, this invention is based on the fact that the known state of art has no provisions for sending test signals to the network, with such signal carrying information about the input which they are introduced at and compare them with the output at which they are detected. Moreover, this invention takes into account the time during which possible misconnections, which are detected as above, will last.

Both the characteristics featuring this invention and its advantages are clearly apparent from the above description.

The device for detecting and/or measuring misconnection time in telecommunication networks according to this invention can be easily implemented, since telecommunication networks are generally designed to be associated with pattern generators and pattern generator/checker receivers (pattern generator-checkers) for network validation procedures.

Pattern generators and receivers are able to generate test words having a proper length in order to detect even short-time misconnections, as well as longer word lengths allow the validation of networks with a larger number of inlets and outlets.

Pattern generators and receivers further are easy to manufacture and a large number of said devices can be provided over the same card, whereby connections for implementation of the device are easy and quick to carry out.

It is obvious that many changes to the device for detecting and/or measuring misconnection time in telecommunication networks described above by way of example, may be made by those skilled in the art without however departing from the novelty principles of the inventive idea, and it is clear that in implementation the components shown may have different forms and be replaced by technical equivalent elements.

The device for detecting and/or measuring misconnection time in telecommunication networks according to this invention can be driven by a properly programmed processor, in order to provide an automatic validation procedure as far as misconnections in telecommunication networks are concerned. Moreover, the device for detecting and/or measuring misconnection time according to this invention may be integrated in a validation device of the telecommunication network such as that which has been described in the Italian patent application No. TO97A001063 filed in the name of the same Applicant of this application.

We claim:

1. A device for detecting misconnections and/or measuring a misconnection time in a fiber optic telecommunication network, the network comprising network elements and fiber optics spans connecting the network elements, each network element comprising inlets for introducing bit streams in the network and outlets for extracting the bit streams from the network, wherein the device comprises:

pattern generator/checker transmitter blocks generating sequences of test words, said pattern generator/checker transmitter blocks being connectable with said network element inlets for inserting test words, in said inlets, which are characteristic of the inlet at which they are introduced; and pattern generator/checker receiver blocks reading and decoding the incoming sequences of test words, said pattern generator/checker receiver blocks being connectable with said network element outlets for identifying said incoming sequences of test words and the inlet where the test words come from.

2. The device according to claim 1, wherein said test words comprise at least one alignment word and one identification word.

3. The device according to claim 2, wherein said pattern generator/checker receiver blocks:

recognize the incoming sequences of test words by using of the alignment words, and identify the inlet where the test word is coming from by using the identification word.

4. The device according to claim 3, wherein said pattern generator/checker transmitter blocks and said pattern generator/checker receiver blocks are driven by a microprocessor controller.

5. The device according to claim 1, wherein said pattern generator/checker transmitter blocks perform a comparison between contents of the test word and expected contents of the test word at the outlet where the test word is received.

6. The device according to claim 1, wherein said pattern generator/checker receiver blocks measure a time interval during which contents of said test words differ from expected contents of said test words at said outlets.

7. The device according to claim 3, wherein the pattern generator/checker receiver blocks comprise a squelching identifing circuit for recognizing a squelching signal.

8. The device according to claim 3, wherein the pattern generator/checker receiver blocks comprise:

an alignment word identifying circuit for:
receiving the test word,
recognizing the alignment word, and
outputting a recognition signal and a synch signal; and a comparator for:
receiving the test word and the synch signal,
further receiving an expected identifier relating to the expected signal,
performing a comparison between the test word and the expected identifier relating to the expected signal, and
issuing identification signals related to the identification of the identification word.

9. The device according to claim 8, further comprising a counter receiving the synch signal, the recognition signal, and the identification signal, in order to measure the misconnection time.

10. A method for detecting misconnections and/or measuring a misconnection time in a fiber optic telecommunication network, the network comprising network elements and fiber optics spans connecting the network elements, each network element comprising inlets for introducing bit streams in the network and outlets for extracting said bit streams from the network, the method comprising:

generating sequences of test words, said test words comprising at least one alignment word and one identification word; and reading and decoding the incoming sequences of test words to identify: said incoming sequences of test words, and the inlet where said sequence of test words come from.

11. The method according to claim 10, further comprising comparing contents of said test words with expected contents for said test words at said outlets.

12. The method according to claim 10, further comprising measuring a time interval during which contents of said test words differ from expected contents of said test words at said outlets.

13. The method according to claim 10, wherein the test word has a length of N bits, the alignment word has a length of M bits, where M and N are integers, and the identification word has a length of M–N bits.

14. The method according to claim 13, wherein the number M of bits related to the alignment word is greater than N/2.

15. The method according to claim 13, further comprising choosing the number N of bits, corresponding to the length of the test word, as a function of the number of inlets of the telecommunication network.

16. The method according to claim 13, further comprising choosing the number N of bits, corresponding to the length of the test word, as a function of a minimum misconnection time to be measured and detected.

17. The method according to claim 15, wherein the number N of bits corresponding to the length of the test word is 32 and the number M of bits is 17.

* * * * *